(12) United States Patent
McIntosh

(10) Patent No.: US 12,534,179 B2
(45) Date of Patent: Jan. 27, 2026

(54) BARRIER DOOR FOR AN AIRCRAFT

(71) Applicant: The Boeing Company, Arlington, VA (US)

(72) Inventor: Darren Carl McIntosh, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 293 days.

(21) Appl. No.: 18/336,136

(22) Filed: Jun. 16, 2023

(65) Prior Publication Data
US 2024/0417057 A1   Dec. 19, 2024

(51) Int. Cl.
*B64C 1/14* (2006.01)
*B64D 45/00* (2006.01)

(52) U.S. Cl.
CPC .......... *B64C 1/1469* (2013.01); *B64C 1/1461* (2013.01); *B64D 45/0028* (2019.08)

(58) Field of Classification Search
CPC ......... E06B 2009/543; E06B 2009/002; E06B 9/08; E01F 13/04; E01F 13/028; A47G 5/02; B64C 1/1461; B64C 1/1469; B64C 1/1423; B64D 11/0023
See application file for complete search history.

(56) References Cited

U.S. PATENT DOCUMENTS

| | | | | |
|---|---|---|---|---|
| 193,573 A * | 7/1877 | Tripp | ........................ | A47G 5/02 160/122 |
| 832,335 A * | 10/1906 | McDonald | ................ | E06B 9/08 160/264 |
| 1,393,405 A * | 10/1921 | Soteros | ...................... | E06B 9/54 160/31 |
| 2,015,993 A * | 10/1935 | Drake | ........................ | E06B 9/54 160/99 |
| 3,500,894 A * | 3/1970 | Pofferi | ................... | A61G 12/00 160/238 |
| 4,597,549 A * | 7/1986 | Ryan | ........................ | B64C 1/10 244/129.5 |
| 5,285,596 A | 2/1994 | Kinsey | | |
| 5,906,421 A * | 5/1999 | Floyd | ........................ | E06B 9/02 312/297 |
| 6,536,502 B2 * | 3/2003 | Britto | ........................ | E06B 9/08 160/293.1 |

(Continued)

FOREIGN PATENT DOCUMENTS

| CN | 212614220 U | 2/2021 |
|---|---|---|
| EP | 2796370 A1 | 10/2014 |

(Continued)

OTHER PUBLICATIONS

EP Search Report mailed Aug. 26, 2024 in re EP Application No. 24165860.8.

(Continued)

*Primary Examiner* — Johnnie A. Shablack
(74) *Attorney, Agent, or Firm* — COATS & BENNETT, PLLC

(57) ABSTRACT

A barrier door configured to be mounted in an opening in a cabin area of an aircraft. The barrier door is movable between an open position to allow persons to pass through the opening and a closed position to prevent passengers from moving through the opening. The barrier door is configured to be locked in the closed position.

20 Claims, 16 Drawing Sheets

(56) References Cited

U.S. PATENT DOCUMENTS

| | | | |
|---|---|---|---|
| 6,575,435 B1* | 6/2003 | Kotzen | E06B 9/18 |
| | | | 256/25 |
| 6,588,705 B1* | 7/2003 | Frank | B64D 45/0036 |
| | | | 244/129.5 |
| 6,783,098 B1 | 8/2004 | Chavez | |
| 7,051,780 B2 | 5/2006 | Csik et al. | |
| 7,207,370 B2* | 4/2007 | Snyder | E01F 13/028 |
| | | | 242/380 |
| 7,219,709 B1* | 5/2007 | Williams | E01F 13/028 |
| | | | 160/24 |
| 7,370,685 B2* | 5/2008 | Moriya | E06B 9/54 |
| | | | 160/31 |
| 8,087,443 B2* | 1/2012 | Snyder | E01F 13/028 |
| | | | 160/242 |
| 8,763,327 B2* | 7/2014 | Harter | E05F 17/004 |
| | | | 160/222 |
| 8,881,787 B2* | 11/2014 | Wang | E06B 11/04 |
| | | | 160/24 |
| 8,887,441 B2* | 11/2014 | Lundh | E06B 9/08 |
| | | | 49/55 |
| 9,428,940 B1 | 8/2016 | Patrick | |
| 9,598,896 B1* | 3/2017 | Pichik | E06B 9/13 |
| 10,337,244 B2* | 7/2019 | Wang | E06B 9/08 |
| 10,358,858 B2* | 7/2019 | Lietz | E05F 15/79 |
| 10,975,615 B1* | 4/2021 | Vega | E06B 9/24 |
| 11,208,744 B2 | 12/2021 | Urbelis | |
| 11,299,250 B2* | 4/2022 | Movsesian | B64D 45/0028 |
| 11,661,791 B2* | 5/2023 | Katcher | E05C 19/12 |
| | | | 160/23.1 |
| 11,702,886 B2* | 7/2023 | Losik | A01K 1/035 |
| | | | 49/55 |
| 2002/0092951 A1 | 7/2002 | Haviv | |
| 2005/0116098 A1 | 6/2005 | Martens et al. | |
| 2006/0000946 A1 | 1/2006 | Garofani et al. | |
| 2006/0151123 A1* | 7/2006 | Chandler | E06B 9/08 |
| | | | 160/24 |
| 2010/0181030 A1* | 7/2010 | Smoyer | A47G 5/02 |
| | | | 160/290.1 |
| 2014/0196371 A1* | 7/2014 | Lundh | E06B 9/08 |
| | | | 49/449 |
| 2015/0305202 A1* | 10/2015 | Veino | H05K 7/20745 |
| | | | 165/96 |
| 2016/0076291 A1 | 3/2016 | Kleiman | |
| 2016/0083092 A1 | 3/2016 | Long et al. | |
| 2016/0194068 A1* | 7/2016 | Savian | B64C 1/1461 |
| | | | 160/213 |
| 2017/0341750 A1 | 11/2017 | Gonnsen | |
| 2018/0265216 A1 | 9/2018 | Breigenzer | |
| 2018/0346091 A1 | 12/2018 | Movsesian et al. | |
| 2019/0218854 A1* | 7/2019 | Fusco | E06B 9/13 |
| 2020/0108907 A1 | 4/2020 | Movsesian et al. | |
| 2020/0115029 A1 | 4/2020 | Movsesian et al. | |
| 2020/0385124 A1* | 12/2020 | Zhang | F16H 21/44 |
| 2021/0291955 A1 | 9/2021 | Breigenzer et al. | |
| 2022/0161930 A1* | 5/2022 | Aten | B64D 11/0606 |
| 2022/0162905 A1* | 5/2022 | Huang | E06B 9/13 |
| 2022/0355949 A1 | 11/2022 | Reinck et al. | |
| 2023/0047018 A1 | 2/2023 | Chadwell | |
| 2024/0081557 A1* | 3/2024 | Korn | A47G 5/02 |
| 2025/0143489 A1* | 5/2025 | Murrell | E04B 2/7416 |
| 2025/0176739 A1* | 6/2025 | Lundh | E06B 9/08 |

FOREIGN PATENT DOCUMENTS

| | | |
|---|---|---|
| EP | 2851296 A1 | 3/2015 |
| EP | 3552963 A1 | 10/2019 |
| EP | 3741676 A1 | 11/2020 |
| FR | 1252817 A | 2/1961 |
| GB | 2307712 A | 6/1997 |
| WO | 03038224 A1 | 5/2003 |

OTHER PUBLICATIONS

EP Search Report mailed Jul. 24, 2024 in re EP Application No. 24167937.2.

EP Search Report mailed Sep. 9, 2024 in re EP Application No. 24165842.6.

Federal Aviation Administration, "AC 120-110—Aircraft Secondary Barriers and Alternate Flight Deck Security Procedures", U.S. Department of Transportation, Apr. 14, 2015, pp. 1-5.

Hexarmor, "SuperFabric cut protection, HexArmor with cut-resistant SuperFabric inside", Jan. 1, 2023, pp. 1-2.

Aitex, "Anti-Vandal Upholstery Resistant to Cuts by Stabs and Arson", retrieved from the internet: URL: https://www.aitex.es/tapicerias-antivandalicas/ [retrieved on May 2, 2023]; pp. 1-5.

Cut-Tex Pro, "The Ultimate Cut Protection—Technical Data Sheet", Jan. 1, 2023, pp. 1-3.

Peppermill Home, "Spectrum Via 36x80 Vinyl Folding Door", Jan. 1, 2023, pp. 1-5.

Wheatbelt, Inc., "Two New Rolling Shutter Slats from Wheatbelt, Inc." Jan. 1, 2023, pp. 1-5.

Wheatbelt, Inc., "Rolling Shutter Manufacturing in Hillsboro, KS", retrieved from the internet: URL: https://www.rollupshutter.com [retrieved on Jun. 15, 2023], pp. 1.

ROLL-A-SHIELD, "RAS-section-view-of-slats", retrieved from the internet: URL: https://rollashield.com/shutters/ras-section-view-of-slats/ [retrieved on Jun. 15, 2023], pp. 1-2.

Cut-Tex Pro, "Cut Resistant Fabric for Clothing & Workwear (Cut Level 5)", retrieved from the internet: URL: https://cut-tex.com/ [retrieved on Jun. 15, 2023], pp. 1-25.

Aitex, "Vandal Proof Upholstery Which Can Withstand Slashing and Burning", retrieved from the internet: URL: https://www.aitex.es/tapicerias-antivandalicas/?lang=en [retrieved on Jun. 15, 2023], pp. 1-5.

Hexarmor, "Global Leader in Personal Protective Equipment", retrieved from the internet: URL: https://www.hexarmor.com/ [retrieved on Jun. 15, 2023], pp. 1-5.

Kozane, "High-performance and cut-resistant fabrics for outstanding protection and wearability", retrieved from the internet: URL: https://www.kozaneprotection.com/ [retrieved on Jun. 15, 2023], pp. 1-6.

* cited by examiner

BARRIER DOOR FOR AN AIRCRAFT

TECHNOLOGICAL FIELD

The present disclosure relates generally to the field of barriers and, more specifically, to barrier doors configured to be used within an aircraft.

BACKGROUND

Aircraft have a flight deck that includes flight instruments, instrument panels, and various controls that enable the flight personnel to operate the aircraft. The flight deck is positioned towards the front of the aircraft and is usually a separate compartment away from the cabin area where passengers sit during flight. A flight deck door further separates the flight deck from the cabin area.

The flight deck door is closed and locked during flight. This allows the flight personnel to concentrate on operating the aircraft and also prevents entry of unwanted persons into the flight deck. However, the flight deck door may be opened during flight for various reasons. One occurrence is when the flight personnel use the lavatory which is located in the cabin area of the aircraft. Another occurrence is when food and/or drinks that are prepared in the galley of the cabin area are delivered to the flight personnel on the flight deck.

Opening of the flight deck door could present an opportunity for an unwanted person to gain entry to the flight deck. The unwanted person could suddenly rush the front of the aircraft once the flight deck door is opened and force their way into the flight deck. It would be difficult for flight personnel working in the cabin area to react to this movement in a fast enough manner to close and lock the flight deck door.

A device is needed that would inhibit a person from rushing towards the flight deck. The device would prevent the person from reaching the front of the aircraft or would slow their movement such that the flight deck door could be closed and locked prior to the person reaching the flight deck.

SUMMARY

One aspect is directed to a barrier door to control movement of people through an opening in a cabin area of an aircraft. The barrier door comprises: a body comprising a frame sized to fit within the opening and comprising exterior members that are connected together and form an outer perimeter that extends around a central section; and a fabric curtain connected to the frame and that extends across the central section. A lock is connected to the body and configured to engage with an edge of the opening. The body is movable between an open position that is away from the opening and a closed position that extends across the opening and with the lock engaged to secure the body in the opening.

In another aspect, a window is positioned within the fabric curtain to enable viewing through the barrier door and wherein the fabric curtain is opaque and the window comprises one or more openings through the fabric curtain positioned within the central section of the frame.

In another aspect, the exterior members comprise an upper member and a lower member that each comprise links that are pivotally connected together to allow the frame to fold together in the closed position.

In another aspect, interior members extend between the upper member and the lower member and across the central section with the interior members comprising a unitary, elongated shape.

In another aspect, the lock comprises a handle positioned on a first side of the body and is configured to face towards a flight deck of the aircraft and the handle is positioned away from a second side of the body that faces into a passenger section of the aircraft.

In another aspect, a fiber optic member is attached to the curtain and extends within the central section with the fiber optic member configured to be illuminated in the closed position.

In another aspect, the lock comprises a magnet configured to engage with the edge of the opening in the closed position.

In another aspect, the lock comprises a connector mounted to the frame and a post configured to be connected to the aircraft at the edge of the opening with the post being rotatable relative to the frame and wherein the post is configured to engage with the connector in the closed position and to rotate relative to the frame to apply a tensioning force to the curtain.

In another aspect, the connector comprises one or more extensions that extend outward from a lateral side of the body and the post comprises one or more receptacles with the one or more receptacles sized to receive the one or more extensions.

One aspect is directed to a barrier door to control movement of people through an opening in a cabin area of an aircraft. The barrier door comprises a body sized to fit within the opening and movable between an open position and a closed position that extends across the opening. A lock comprises a post configured to be mounted at an edge of the opening and engagement members mounted to the body and to the post that are configured to engage together. The post is configured to rotate relative to the body to apply a tensioning force to the body when the body is in the closed position and the engagement members are engaged together.

In another aspect, a handle is mounted to the post with the handle extending outward in a first direction that is positioned on a first side of the body that faces towards a flight deck of the aircraft when the body is in the closed position and with the handle being shielded from a passenger section of the cabin area when the body is in the closed position.

In another aspect, the engagement members comprise receptacles and connectors that are shaped and sized for the connectors to be inserted into and engage with the receptacles.

In another aspect, the body comprises a plurality of vertical sections that are pivotally connected together and configured to fold together when the body is in the closed position.

In another aspect, the body comprises a frame with exterior members that are connected together and form an outer perimeter that extends around a central section and a fabric curtain connected to the frame and that extends across the central section.

In another aspect, a window is positioned in the body to enable viewing through the body when the body is in closed position.

In another aspect, a fiber optic member is attached to the body 30 with the fiber optic member configured to be illuminated when the body is in the closed position.

One aspect is directed to a method of controlling movement of passengers along an aisle within a cabin area of an aircraft. The method comprises: prior to opening a flight deck door, moving a barrier door to a closed position with a flight deck being on a first side of the barrier door and a passenger section of the cabin area being on a second side of the barrier door with the barrier door comprising a body and a lock; locking the barrier door in the closed position; after locking the barrier door, opening the flight deck door and providing access to flight personnel to a front section of the cabin area; after providing access to the front section of the cabin area to the flight personnel, reclosing the flight deck door; and after reclosing the flight deck door moving the barrier door to an open position and providing access to passengers in the passenger section to the front section of the cabin area.

In another aspect, locking the barrier door in the closed position comprises inserting connectors on the barrier door into a post that is positioned along the aisle; and rotating the post and applying a tensioning force to the barrier door.

In another aspect, the method further comprises monitoring the position of the barrier door and activating an indicator in the flight deck when the barrier door is in the closed position.

In another aspect, the method further comprises moving the barrier door from the closed position to the open position by folding together vertical sections of the barrier door.

The features, functions and advantages that have been discussed can be achieved independently in various aspects or may be combined in yet other aspects, further details of which can be seen with reference to the following description and the drawings.

DETAILED DESCRIPTION

Figure 1:
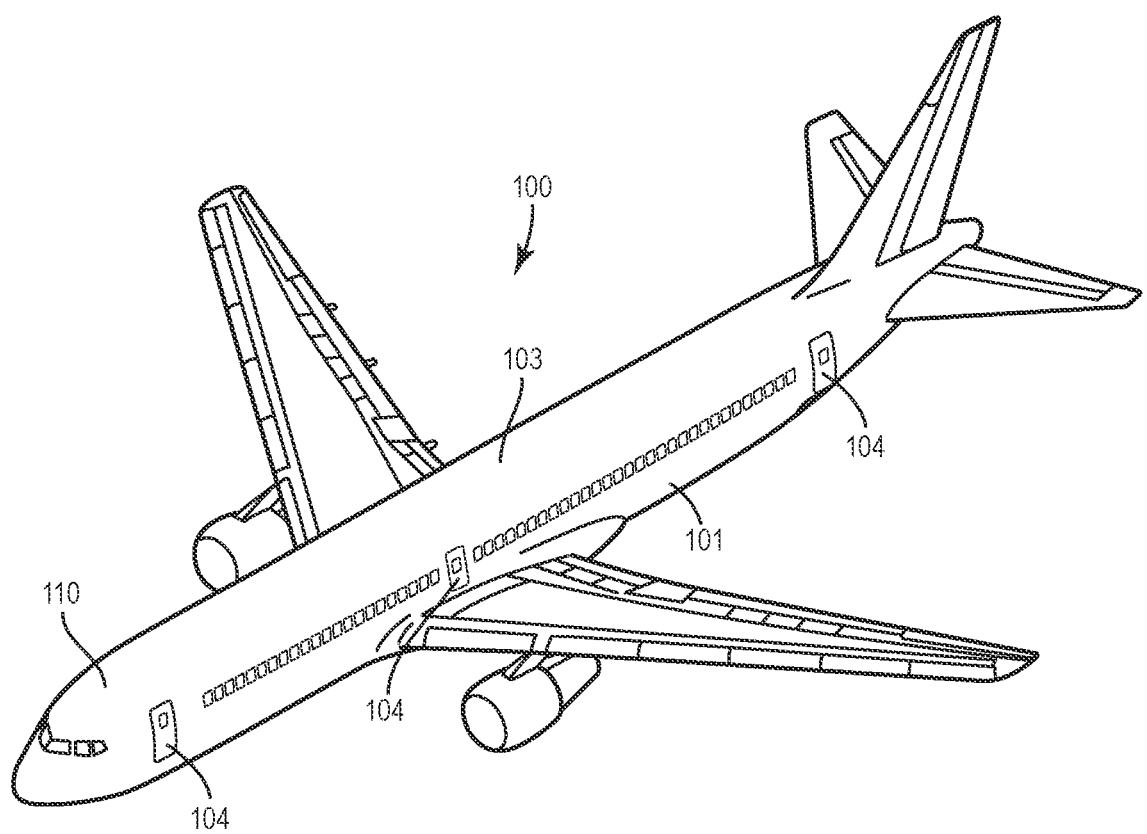
FIG. 1 is a perspective view of an aircraft.
Figure 2:
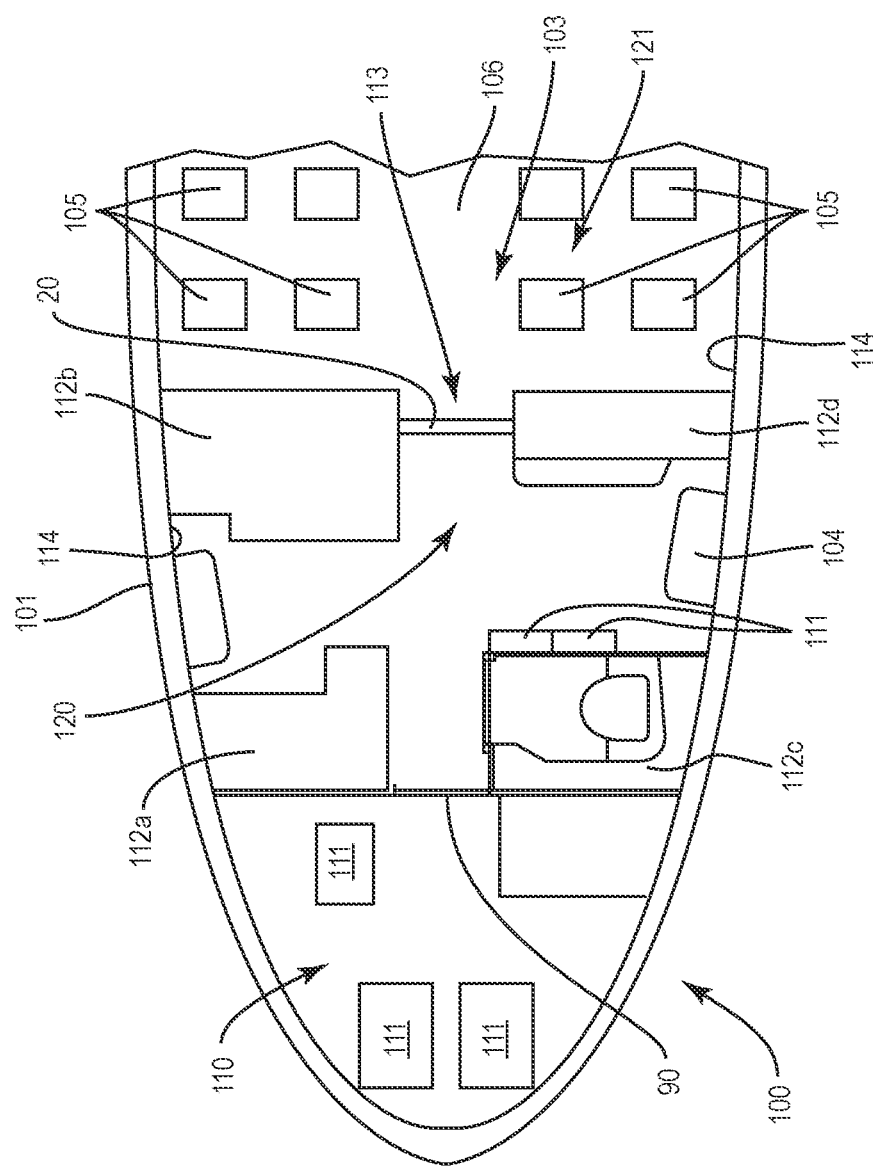
FIG. 2 is a schematic top view of a flight deck and front section of a cabin area within an interior of the aircraft of FIG. 1.

FIGS. 1 and 2 illustrate an aircraft 100 that includes a fuselage 101. A flight deck 110 is positioned at a front of the fuselage 101 and a cabin area 103 is positioned rearward. The cabin area 103 is equipped for accommodating passengers. The size of the flight deck 110 and the cabin area 103 can vary depending upon the aircraft 100. One or more doors 104 provide for passengers to enter and exit the aircraft 100.

The flight deck 110 includes one or more crew seats 111 for the flight personnel including the pilot, co-pilot, and navigator. Various controls and instrument panels (not illustrated) are located for use by the pilot and co-pilot to control the aircraft 100.

The cabin area 103 is positioned along the fuselage 101 aft of the flight deck 110. The cabin area 103 includes a passenger section 121 with passenger seats 105 arranged in rows along one or more aisles 106. In some examples such as a commercial airline, the passenger seats 105 extend throughout the cabin area 103. In other examples in which the aircraft 100 is used for cargo transport, a limited number of passenger seats 105 are positioned in the cabin area 103.

The cabin area 103 also includes a vestibule 120 positioned between the flight deck 110 and the passenger section 121. In some examples, the vestibule 120 includes crew seats 111 for use by flight personnel such as the flight attendants. The crew seats 111 can fold to be out of the way when not being used. The vestibule 120 includes one or more monuments 112 that are mounted to the structural members of the aircraft 100 within the fuselage 101. The monuments 112 are functional units used during flight with examples including but not limited to galleys, lavatories, and stowage units. In some examples, the monuments 112 are shaped and sized to extend from the floor 107 to the ceiling 108 of the cabin area 103. In some examples, the monuments 112 extend between a wall 114 of the fuselage 101 to an aisle 106. FIG. 2 further includes the vestibule 120 including a pair of galley monuments 112a, 112b, a lavatory monument 112c, and a stowage monument 112d.

A flight deck door 90 separates the flight deck 110 from the cabin area 103, and specifically separates the flight deck 110 from the vestibule 120. The flight deck door 90 prevents unintended persons from entering the flight deck 110 from the cabin area 103.

Figure 3:
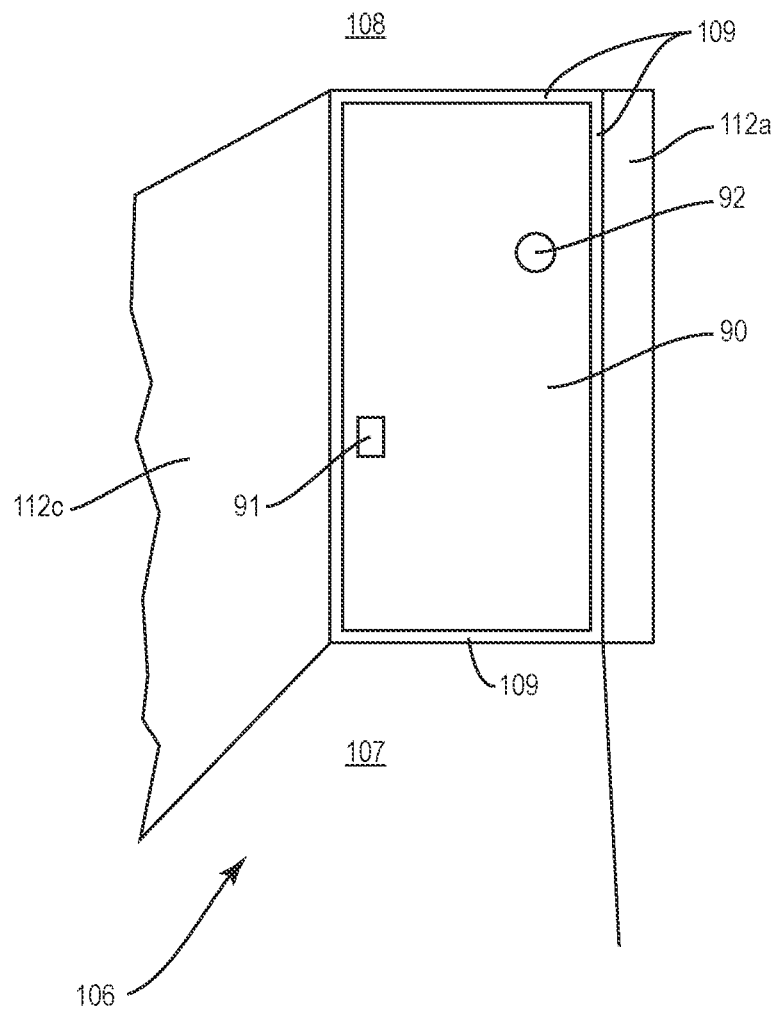
FIG. 3 is a schematic front view of a flight deck door.

As illustrated in FIG. 3A, the flight deck door 90 includes a lock 91 configured to secure the flight deck door 90 when closed. The lock 91 can include various configurations for unlocking, such as a magnetic card reader and input buttons. A viewing hole 92 provides for the flight personnel on the flight deck 110 to see into the cabin area 103 without opening the flight deck door 90. In some examples, the flight deck door 90 is mounted in a frame 109 that mounts onto one or more of the monuments 112, floor 107, and ceiling 108.

The cabin area 103 further includes an opening 113 for passengers and flight personnel to pass through when moving between the vestibule 120 and the passenger section 121. The opening 113 can be formed between various components, such as monuments 112, walls 114 of the fuselage 101, and passenger seats 105. FIG. 2 illustrates an example with the opening 113 formed between a pair of monuments 112b, 112d. The opening 113 can be aligned with an aisle 106 to facilitate movement of passengers during boarding and exiting.

A barrier door 20 is positioned at the opening 113. The barrier door 20 is movable between an open position and a closed position. In the open position the barrier door 20 is retracted or otherwise configured to allow people to pass through the opening 113, such as during boarding and exiting the aircraft 100. In the closed position the barrier door 20 extends across and is locked within the opening 113. In the closed position the barrier door 20 functions to delay or otherwise slow the movement of a person moving from the passenger section 121 towards the flight deck 110. This time provides for the flight deck door 90 to be closed and locked.

Figure 4:
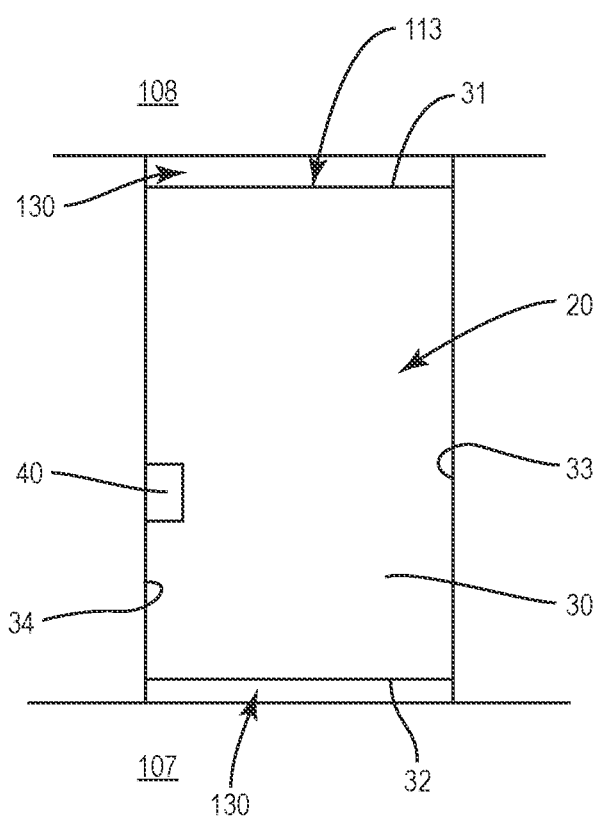
FIG. 4 is a schematic front view of a barrier door.

FIG. 4 schematically illustrates a barrier door 20 in a closed position extending across the opening 113. The barrier door 20 includes an upper side 31, lower side 32, and lateral sides 33, 34. In some examples, the barrier door 20 is smaller than the opening 113 to form one or more gaps 130 between the edges of the opening 113. In other examples, the barrier door 20 is the same size as the opening 113 and there are no gaps. A lock 40 provides for securing the barrier door 20 in the closed position.

Figure 5A:
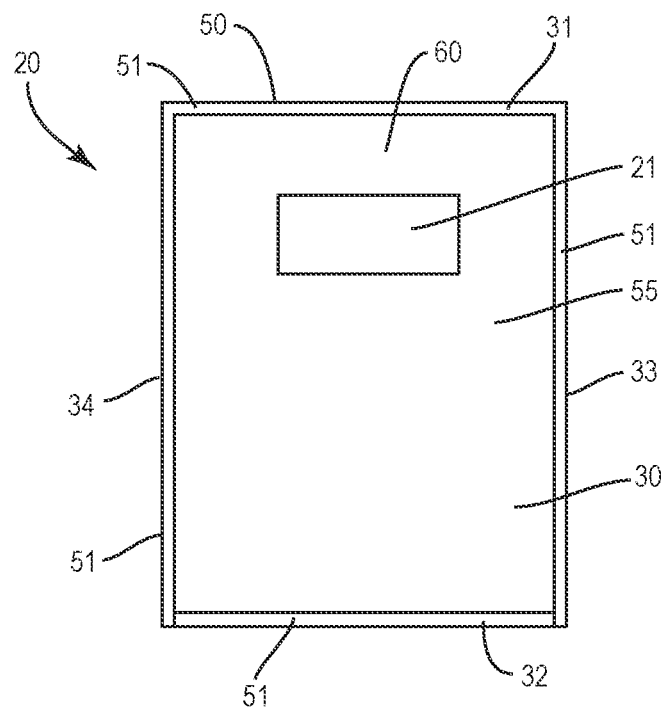
FIG. 5A is a schematic front view of a barrier door.

The barrier door 20 can include various configurations. FIG. 5A includes a barrier door 20 that has a body 30. The body 30 includes a frame 50 with exterior members 51 that form the exterior sides and extend around an enclosed central section 55. In some examples, the frame 50 is rigid and formed from various materials such as but not limited to aluminum, plastic, and various metals.

Figure 5B:
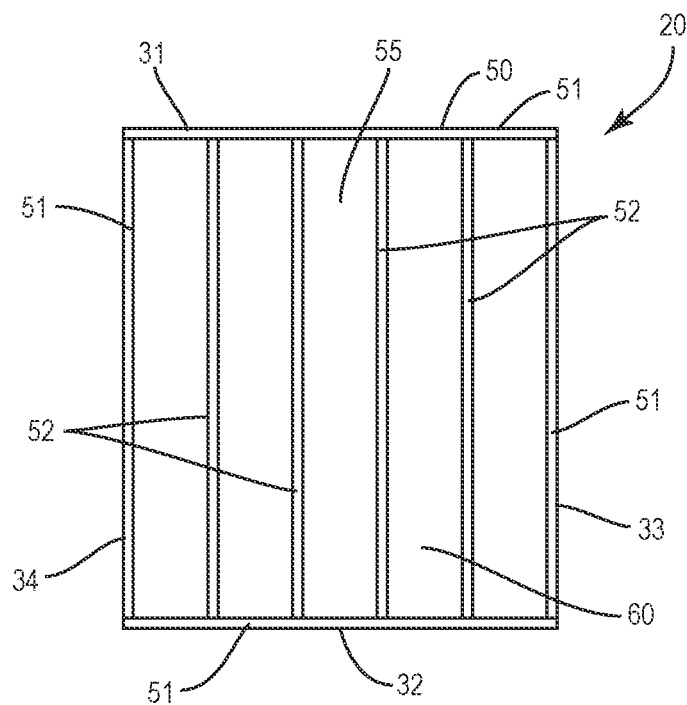
FIG. 5B is a schematic front view of a barrier door.
Figure 5C:
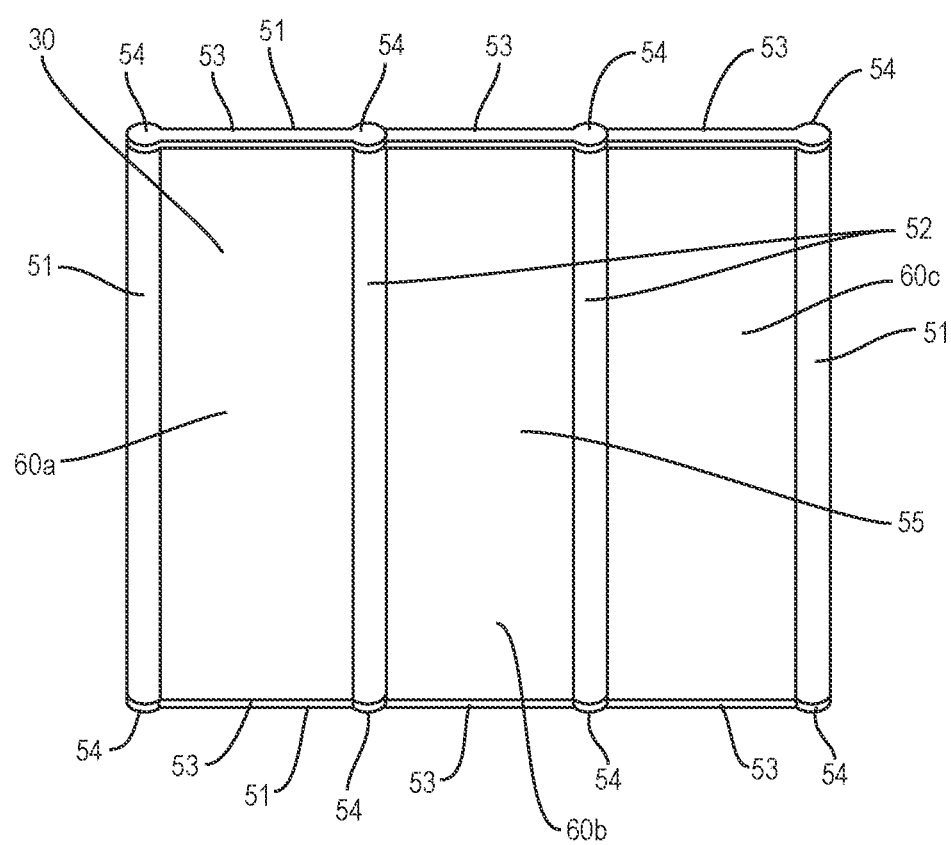
FIG. 5C is a schematic front view of a barrier door.

FIG. 5B illustrates a frame 50 that includes the exterior members 51 and one or more interior members 52 that span across the central section 55. In some examples, the members 51, 52 include fixed shapes. In other examples, one or more of the of the members 51, 52 has a variable shape. In one example as illustrated in FIG. 5C, one or more of the members 51, 52 are constructed from smaller links 53 that are pivotally connected together at connectors 54. FIG. 5C illustrates an example with the upper and lower exterior members 51 constructed from links 53 and connectors 54. The lateral exterior members 51 and the interior members 52 are constructed from elongated, single-piece members. The upper and lower exterior members 51 fold together in the open position in an accordian-like manner. In the closed position, the links 53 pivot outward to extend across the opening 113.

The body 30 is attached to one or more of the members 51, 52. The attachment can be by various manners, including but not limited to adhesives and fasteners. One example includes a fabric curtain 60 sized to extend across the central section 55. In some examples, the curtain 60 is formed from a single piece of material. In other examples, the curtain 60 includes two or more separate pieces that are individually attached to one or more of the exterior members 51 and interior members 52. FIG. 5C includes an example with the curtain 60 formed by separate pieces 60a, 60b, 60c. Each of the pieces is positioned within a separate window formed by the members 51, 52.

The curtain 60 is constructed from various materials. One example includes a reinforced woven fabric that is slash, cut, bite-resistant, and non-flammable. In one example, the woven fabric is constructed from ultra-high molecular weight polyethylene (UHMWPE) and other technical fibers. Examples include CUT-TEX PRO material from PPSS Group, SUPERFABRIC material from Higher Dimensions Materials, Inc., and KOZANE fabric from Granberg AS. In one example, the curtain 60 is a reinforced, vandal-proof upholstery constructed from multiple layers that include a first layer constructed from an upholstery fabric, a second layer that is non-woven material or thin foam, and a third layer that is a woven metal mesh. One example is a multi-layer material available from Aitex Research and Innovation Center.

Figure 6A:
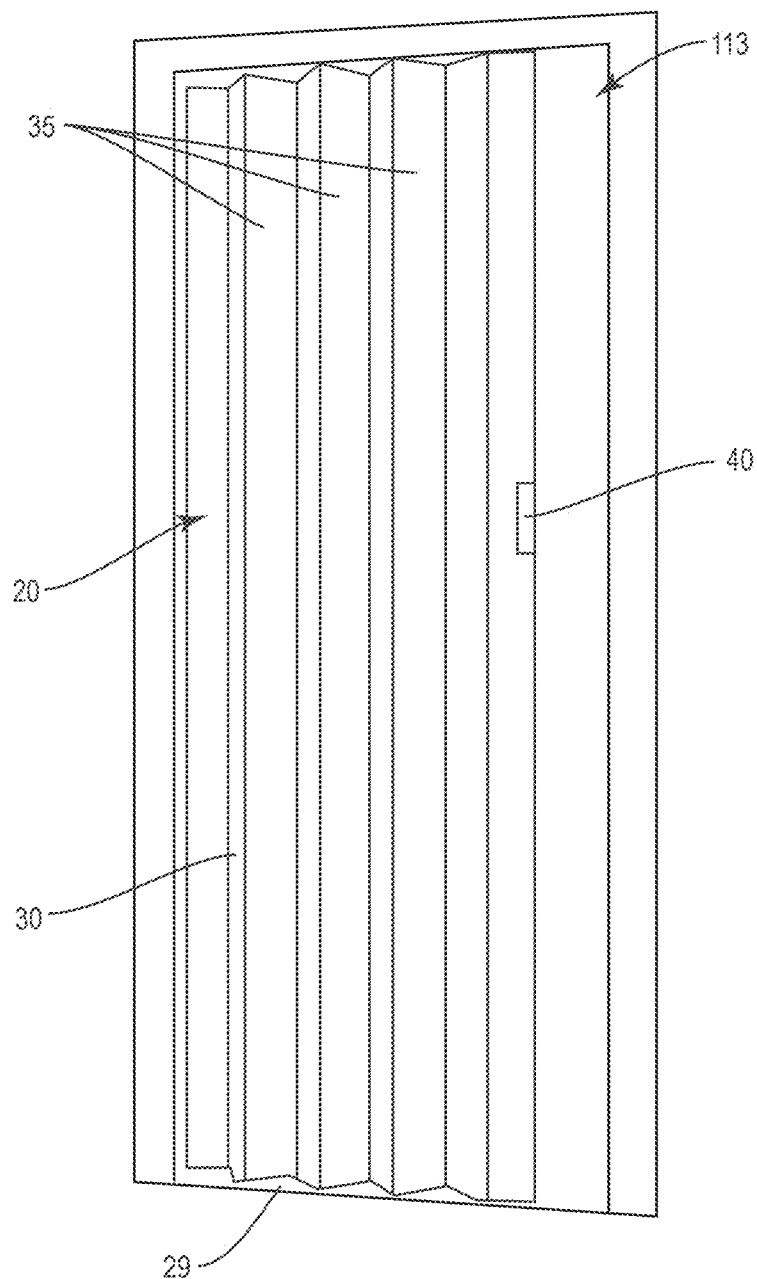
FIG. 6A is a schematic front view of a barrier door.
Figure 6B:
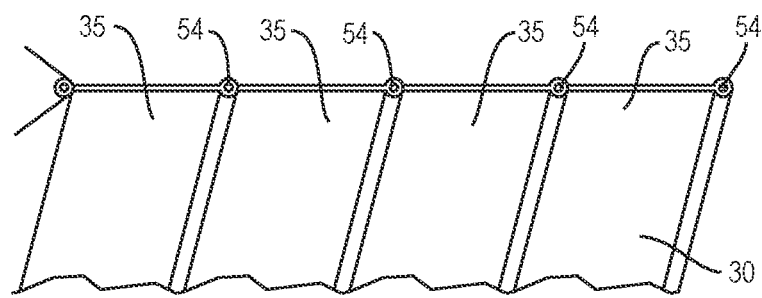
FIG. 6B is a partial top perspective view of the barrier door of FIG. 6A.
Figure 6C:
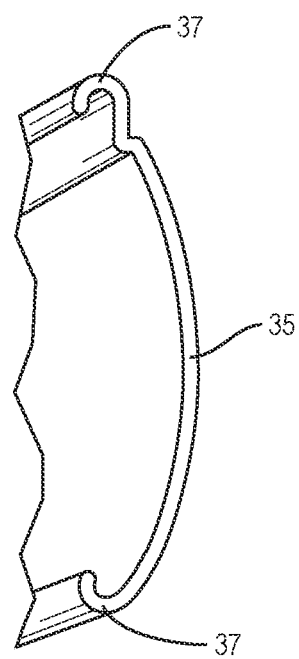
FIG. 6C is a top view of a slat.

In other examples, the body 30 is formed from vertical slats 35. FIGS. 6A and 6B illustrate a barrier door 20 with a body 30 formed by vertical slats 35. The slats 35 include relatively narrow upper and lower sides and elongated lateral sides. The lateral sides are pivotally connected together and provide for vertical joints that extend along the height. In some examples as illustrated in FIG. 6B, connectors 54 such as elongated rods extend the height to connect to the adjacent vertical sides. In some examples as illustrated in FIG. 6C, the slats 35 include lateral sides configured to engage together to provide for pivoting movement. The lateral sides include extensions 37 shaped and sized to engage together with adjacent slats 35. With the barrier door 20 in the closed position, the vertical slats 35 are aligned in an end-to-end configuration to extend across the opening 113. In the open position, the vertical slats 35 fold together in an overlapping arrangement. The slats 35 can be rigid or flexible, and can be constructed from a variety of different materials including but not limited to plastic, aluminum, and Lexan.

Figure 7:
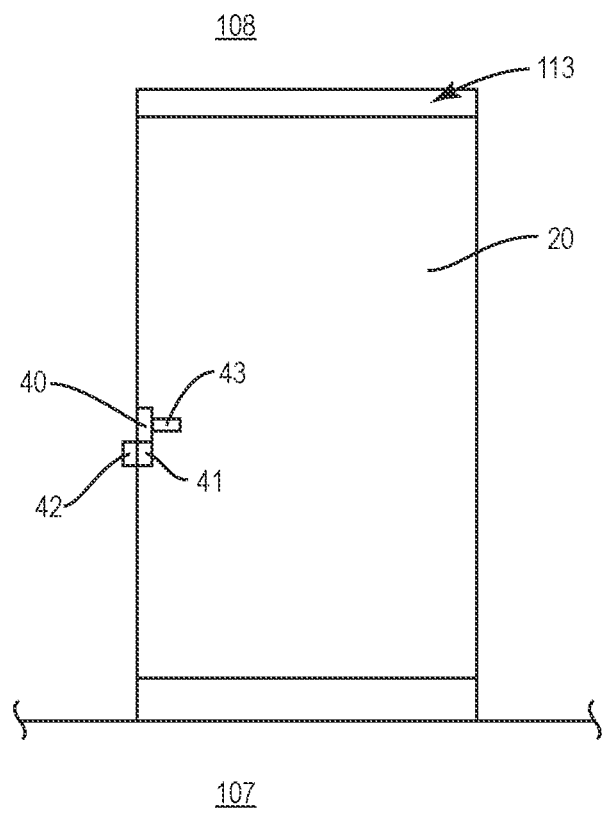
FIG. 7 is a schematic front view of a barrier door.

The lock 40 provides for securing the barrier door 20 in the closed position. In some examples as illustrated in FIG. 7, the lock 40 includes a two piece magnet 41, 42. The lock 40 is configured such that when the barrier door 20 is in the closed position, the magnets 41, 42 are in proximity to create a magnetic field to maintain the closed positioning. In one example as illustrated in FIG. 7, the first magnet 41 is mounted to the body 30 and the second magnet 42 is mounted at the opening 113.

In another example, the lock 40 includes a rotatory latch that is operatively connected to a rod in the body 30 (such as at the lateral side 33, 34). Openings are positioned in one or both of the floor 107 and ceiling 108. In the closed position, the latch is rotated and the one or more rods extend into the openings to secure the barrier door 20 in the closed position. To unlock the barrier door 20, the latch is rotated in the opposing direction to retract the one or more rods from the openings. In some examples, the latch is configured to rotate just when the one or more rods are aligned with the openings to prevent the rods from extending and damaging the floor 107 and/or ceiling 108.

Figure 8:
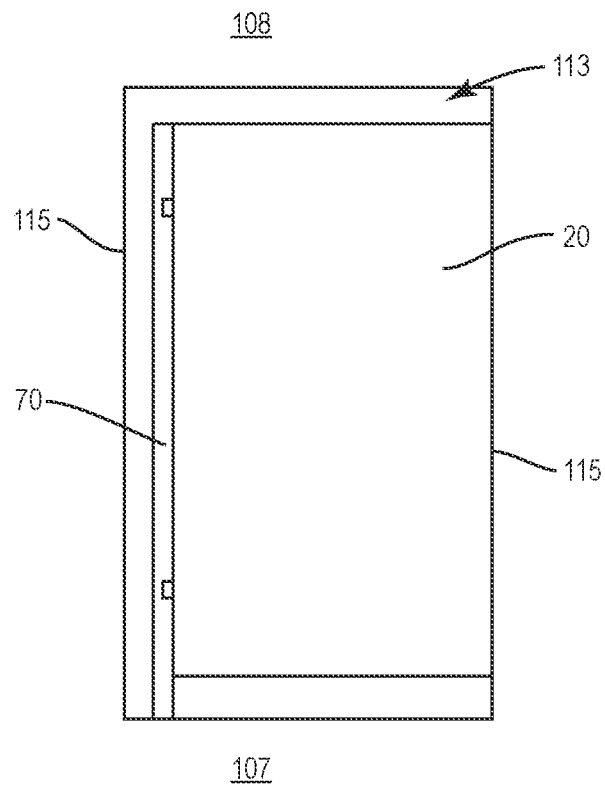
FIG. 8 is a schematic front view of a barrier door.
Figure 9:
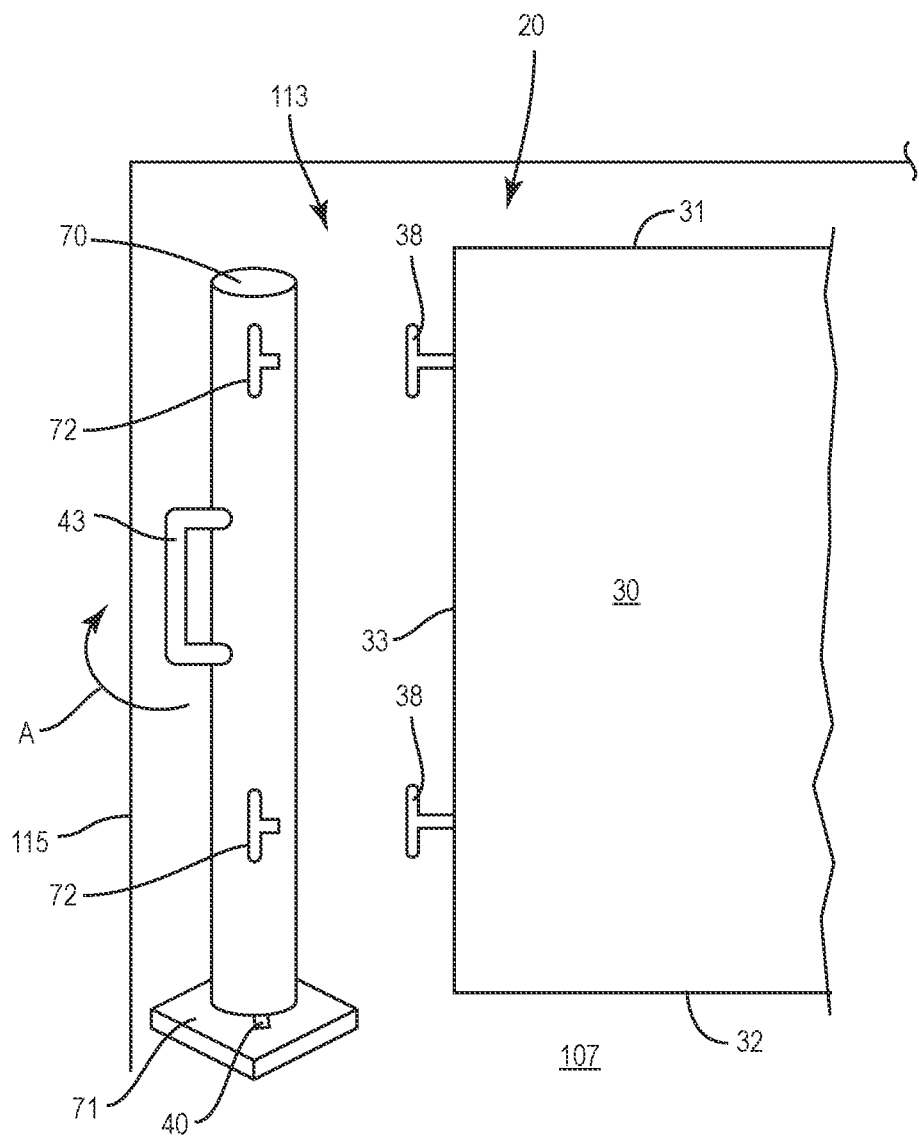
FIG. 9 is a perspective front view of a barrier door that includes a post.

FIG. 8 illustrates an example with the barrier door 20 including a post 70. The post 70 is mounted at the opening 113. In some examples, the post 70 is secured to one or more of the floor 107 and ceiling 108. In other examples, the post 70 is secured to an opening side 115 of the opening 113. FIG. 9 illustrates another example with the post 70 mounted to a base 71. The base 71 is configured to be mounted to the floor 107 with the post 70 rotatable relative to the base 71. In the various examples, the post 70 is configured to engage with and apply a tensioning force to the body 30 in the closed position.

In some examples, the post 70 includes one or more receptacles 72 configured to receive one or more connectors 38 that extend outward from the body 30. During use, the body 30 is moved towards the post 70 and the connectors 38 are inserted into the receptacles 72. The post 70 is then rotated as shown by arrow A in FIG. 9 which causes the connectors 38 to engage within the receptacles 72. The rotation of the post 70 causes a tensioning force to be applied to the body 30.

The receptacles 72 and connectors 38 can include various configurations. The shapes of the connectors 38 and receptacles 72 provide for the body 30 to remain attached to the post 70 during rotation. In one example as illustrated in FIG. 9, each includes a "T" shape. Other examples include different corresponding shapes. FIG. 9 includes an example with the connectors 38 on the body 30 and the receptacles 72 on the post 70. In other examples, this positioning is reversed with the receptacles 72 in the body 30 and the connectors 38 on the post 70. In some examples, the post 70 and body 30 engage by a hook-and-loop fasteners. The fasteners are engaged together and then the post 70 is rotated to apply the tensioning force.

The lock 40 secures the post 70 at the desired rotational position. In one example, the lock 40 includes a pin that is inserted into openings in the post 70. The openings align at different rotational positions and the pin provides for maintaining the rotational position. In another example, the lock 40 includes a spring-biased finger mounted on the base 71 that mates with a toothed-gear on the post 70. The teeth on the gear are configured to engage with the finger and maintain the rotational position. The finger is pulled away from the gear to disengage and allow for opposing rotation to release the body 30.

In some examples, a handle 43 is connected to the barrier door 20. The handle 43 provides for moving the barrier door 20 between the open and closed positions. In some examples, the handle 43 is connected to the lock 40 and configured to move the lock 40 between locked and unlocked positions. FIG. 9 includes the handle 43 positioned on the post 70 to provide flight personnel a place to grab the post and apply the rotational force. In some examples, the handle 43 is positioned on a single side of the barrier door 20 that faces forward towards the flight deck 110. This positioning provides for the flight personnel to lock and unlock the barrier door 20 and prevents a passenger in the passenger section 121 from unlocking and opening the barrier door 20. In other examples, a handle 43 is positioned on both sides of the barrier door 20. In some examples, there is no lock 40 because the handle 43 is positioned to be out of reach and thus cannot be used to rotate the post 70 to uncouple the connectors 38.

In some examples, the barrier door 20 is configured to provide for a person to see through the barrier door 20. This provides for a person in the passenger section 121 to see through the barrier door 20 and into the vestibule 120 and/or flight deck 110. This also provides for flight personnel in the flight deck 110 and/or vestibule 120 to see into the passenger section 121. In some examples as illustrated in FIG. 5A, the barrier door 20 includes one or more windows 21 that are enlarged openings in the body 30 and located at various locations along the body 30. A cover material is attached to the body 30 and extends across the opening. The cover material (e.g., mesh, plastic sheathing) provides for viewing and also prevents a person from squeezing through the opening to get through the barrier door 20.

Figure 10:
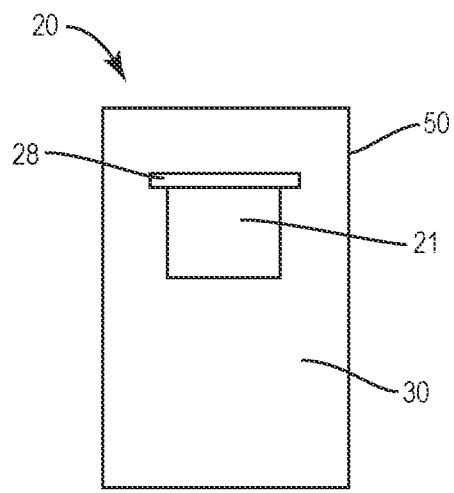
FIG. 10 is a front schematic view of a barrier door.

FIG. 10 illustrates a barrier door 20 with a flap 28 mounted to the body 30 at the window 21. The flap 28 is selectively movable between a retracted position (as shown in FIG. 10) that is away from the window 21 and an extended position that extends over the window 21. The flap 28 is opaque and prevents seeing through the window 21 in the extended position.

Figure 11:
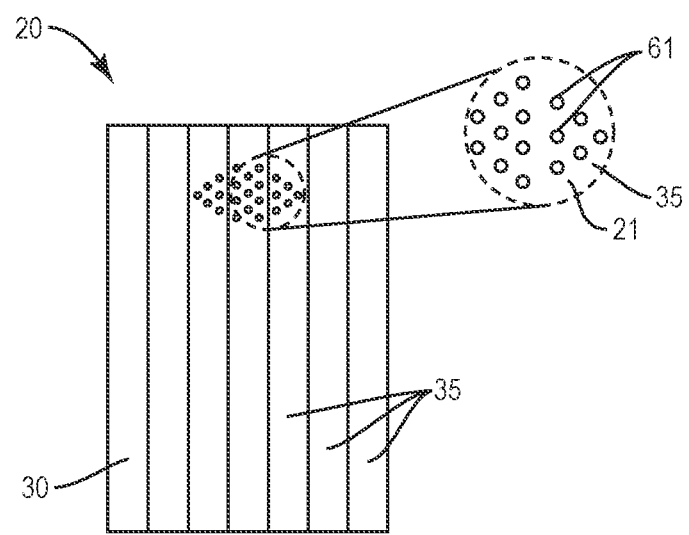
FIG. 11 is a front schematic view of a barrier door.

In another example as illustrated in FIG. 11, the window 21 is formed by a series of small holes 61 that extend through the body 30. The holes 61 can have a variety of shapes, sizes, and configurations. In the example of FIG. 11, the body 30 is formed by vertical slats 35. One or more of the slats 35 include the holes 61 that form the window 21. The slats 35 are constructed from a rigid material such as metal or plastic and the holes 61 have relatively small sizes (e.g., diameter of 0.50", 0.25").

In another example, one or more sections of the body 30 are constructed from transparent material. One specific example includes Lexan. This provides for a person to see through the section of the body 30 and through to the opposing side of the barrier door 20. In one example, one or more of the vertical slats 35 are constructed from transparent material. In another example, the entire body 30 is constructed from the transparent material. In another example, the body 30 includes a mesh material that provides for viewing.

Figure 12:
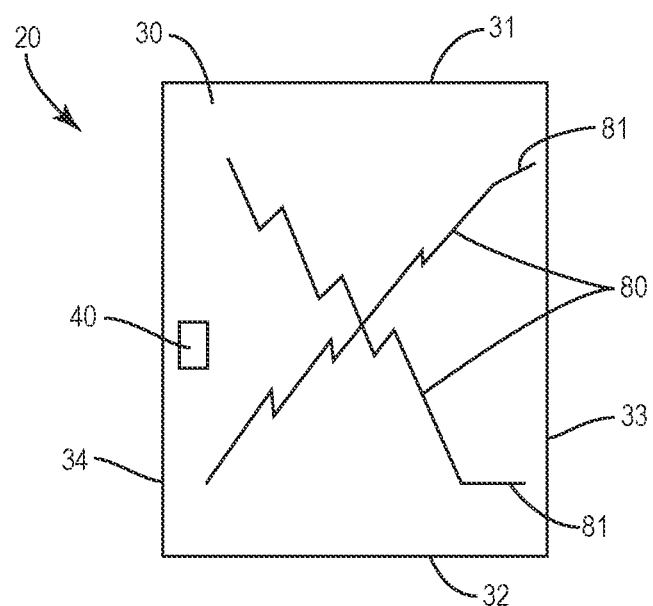
FIG. 12 is a front schematic view of a barrier door.

In some examples as illustrated in FIG. 12, one or more optical fibers 80 are connected to the body 30. The optical fibers 80 are flexible, transparent fibers that provide for transmitting light and thus become illuminated. The optical fibers can be secured to the body 30 such as but not limited to fasteners, weaving, and adhesives. One or more leads 81 provide for transmitting the light signals to the optical fibers 80. The optical fibers 80 can be arranged in various configurations, such as an "X" to indicate that the barrier door 20 is in the closed position. The optical fibers 80 can also be arranged to spell words, such as BOEING or the name of the airline.

Figure 13:
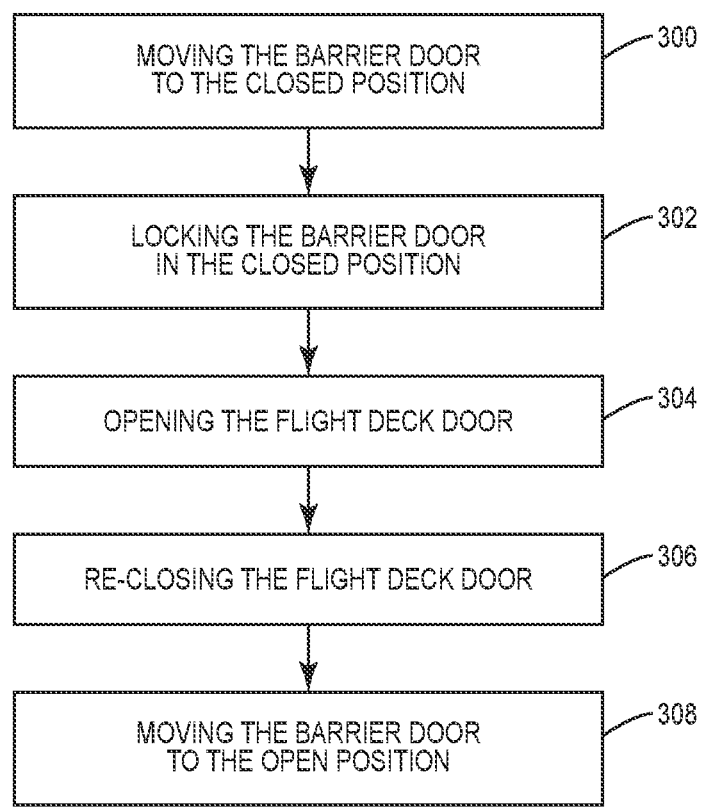
FIG. 13 is a flowchart diagram of a method of controlling movement of persons on an aircraft.

FIG. 13 illustrates a method of controlling movement of passengers within a cabin area 103. The method includes that prior to opening 113 the flight deck door 90, moving the barrier door 20 to a closed position (block 300). The barrier door 20 is positioned in a cabin area 103 with the flight deck 110 on a first side of the barrier door 20 and a passenger section 121 of the cabin area 103 being on a second side of the barrier door 20. The barrier door 20 is locked in the closed position (block 302). After locking the barrier door 20, opening the flight deck door 90 and providing access to flight personnel to the vestibule 120 of the cabin area 103 (block 304). After providing access to the vestibule 120 of the cabin area 103 to the flight personnel, reclosing the flight deck door 90 (block 306). After reclosing the flight deck door 90, moving the barrier door 20 to an open position and providing access to passengers in the passenger section 121 to the vestibule 120 of the cabin area 103 (block 308).

The barrier door 20 acts as a barrier to inhibit a person that is in the passenger section 121 from moving into the vestibule 120 and into the flight deck 110. In some examples, the barrier door 20 functions to slow the movement of the person into the vestibule 120. The barrier door 20 causes a delay as it requires the person to break the barrier door 20 or otherwise moving the barrier door 20 to the open position. This time provides for flight personnel to move into the flight deck 110 and secure the flight deck door 90. The flight deck door 90 is more secure than the barrier door 20 and may prevent the person from reaching the flight deck 110.

Figure 14:
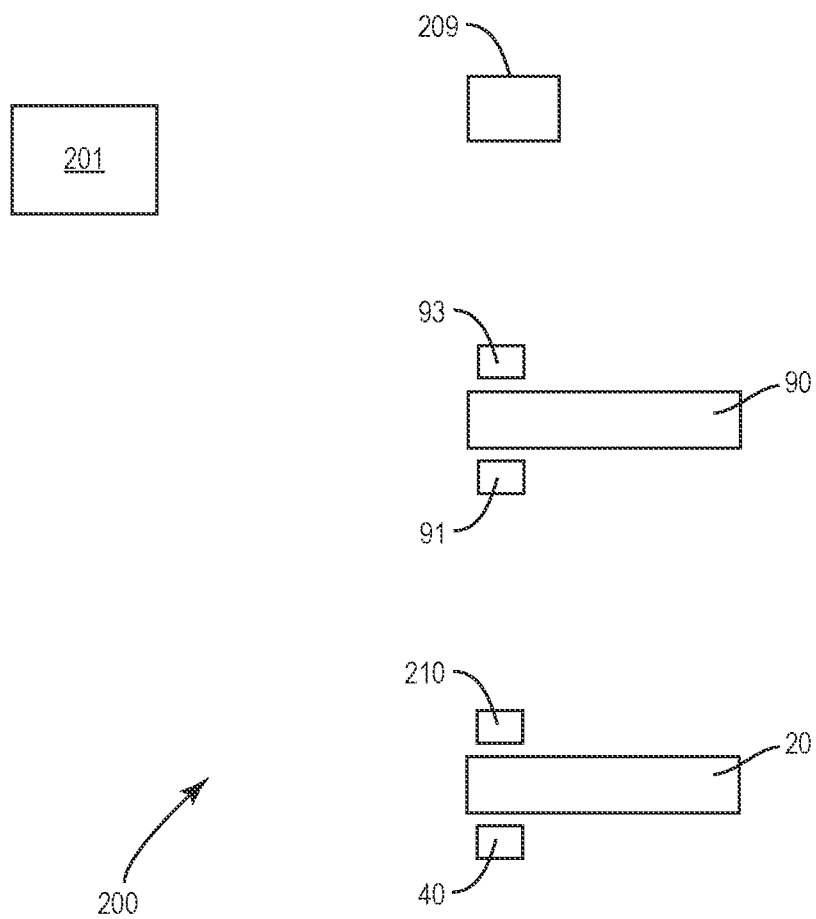
FIG. 14 is a schematic diagram of a control unit that monitors a status of the flight deck door and barrier door.

The aircraft 100 is equipped with a monitoring system 200 as illustrated in FIG. 14. The monitoring system 200 receives signals from a sensor 93 at the flight deck door 90 and a sensor 210 at the barrier door 20. The monitoring system 200 provides flight personnel in the flight deck 110 the status of the flight deck door 90 and the barrier door 20. This prevents the flight deck door 90 from being opened when the barrier door 20 is in the open position. The sensor 210 senses the position of the barrier door 20 and sensor 93 senses the position of the flight deck door 90. A control unit 201 receives signals from the sensors 210, 93 and monitors the positioning. An indicator 209 such as a light or audible alarm is positioned in the flight deck 110. Prior to opening the flight deck door 90, the flight personnel checks the status of the barrier door 20. If the barrier door 20 is in the closed position, the flight deck door 90 can be opened. This provides for the flight personnel to access the vestibule 120 of the cabin area 103, such as to use the lavatory. If the barrier door 20 is in the open position, the flight deck door 90 remains closed. This prevents a person that may be in the vestibule 120 from gaining access to the flight deck 110.

In some examples, the control unit 201 controls the lock 40 on the flight deck door 90. The control unit 201 maintains the lock 40 engaged when the barrier door 20 is in the open position. The control unit 201 disengages the lock 40 and allows it to be opened when the barrier door 20 is closed.

Figure 15:
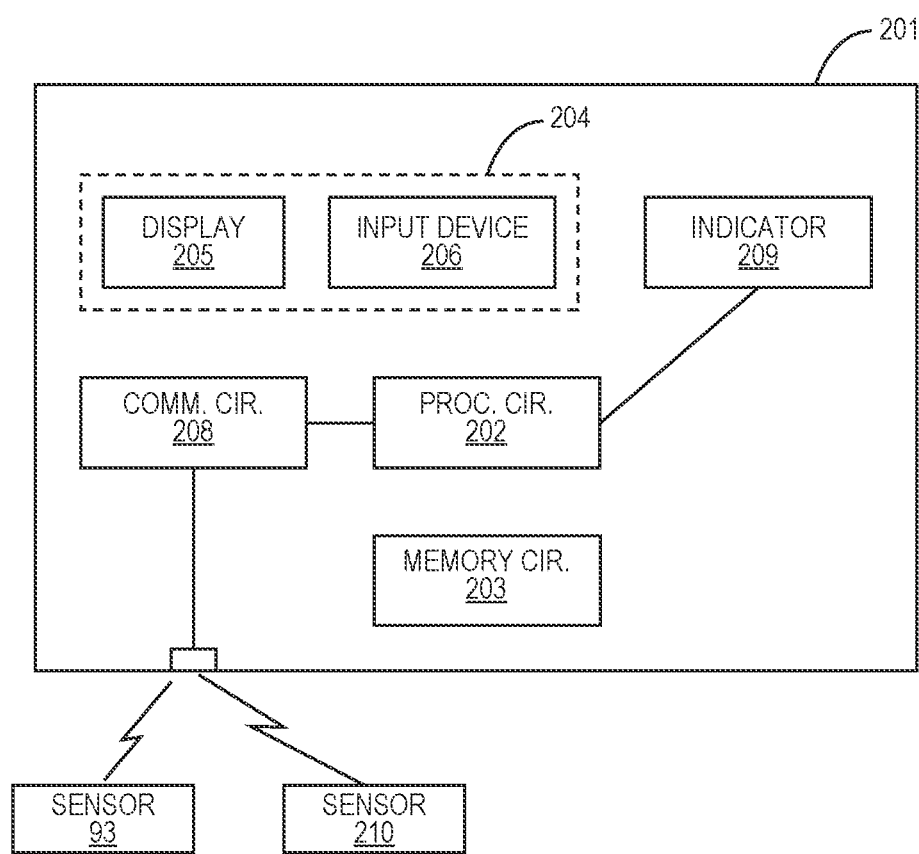
FIG. 15 is a schematic diagram of a control unit.

The control unit 201 monitors the status and operation of the flight deck door 90. As illustrated in FIG. 15, the control unit 201 includes processing circuitry 202 and memory circuitry 203. The processing circuitry 202 controls overall operation of the monitoring according to program instructions stored in the memory circuitry 203. The processing circuitry 202 can include one or more circuits, microcontrollers, microprocessors, hardware, or a combination thereof. Memory circuitry 203 includes a non-transitory computer readable storage medium storing program instructions, such as a computer program product, that configures the processing circuitry 202 to implement one or more of the techniques discussed herein. Memory circuitry 203 can include various memory devices such as, for example, read-only memory, and flash memory.

The control unit 201 includes communication circuitry 208 that provides for communication functionality with the 93, 210. The communication circuitry 208 can provide for one-way communications from the sensors 93, 210 or two-way communications that are both to and from the sensors 93, 210. The control unit 201 can also communicate with other systems on the aircraft 100, such as a flight control system that controls the operations of the aircraft during flight.

A user interface 204 provides for flight personnel to monitor the status. The user interface 204 can include one or more input devices 206 such as but not limited to a keypad, touchpad, roller ball, and joystick. The user interface 204 can also include one or more displays 205 for displaying information. Displays 205 can be positioned in one or more of the flight deck 110 and vestibule 120.

The indicator 209 provides for a visual and/or audible indication of the status of one or both of the flight deck door 90 and barrier door 20. The indicator 209 can be a separate device, or can be incorporated within the user interface 204, such as a display icon on a display 205.

In one example, the lock 40 includes a metallic strip that extends along one of the outer sides (e.g., lateral side 33). The lock 40 also includes an electromagnetic locking device that engages with the metallic strip when the barrier door 20 is in the closed position to secure the position. Flight personnel can unlock the lock 40 from the front side and allow for moving the barrier door 20 to the open position. In the event of a power outage, the lock 40 is configured to disengage to provide for moving the barrier door 20 to the open position.

In some examples as illustrated in FIG. 4, the barrier door 20 is sized with gaps 130 formed between one or more of the sides 31, 32, 33, 34 and the edges of the opening 113 when the barrier door 20 is in the closed position. FIG. 4 illustrates a specific example with gaps 130 formed between the upper side 31 and the ceiling 108 and between the lower side 32 and the floor 107. In these examples, there is no track or other mounts (e.g., tracks) on the floor 107 or ceiling 108. This can facilitate installation of the barrier door 20, particularly in retrofitting an existing aircraft 100.

In some examples, the barrier door 20 is connected along one or both lateral sides 33, 34. In some examples, a hinge is positioned along one of the lateral sides 33, 34 for the body 30 to pivot between the open position and the closed position.

In one example as illustrated in FIG. 2, the barrier door 20 is mounted towards a forward section of the cabin area 103 to inhibit a person from gaining access to the flight deck 110.

In other examples, the barrier door 20 is mounted at different locations in the aircraft 100 to inhibit movement of a person.

In some examples, the cabin area 103 includes a vestibule 120 between the flight deck 110 and the passenger section 121. In other examples such as smaller aircraft 100, there is no vestibule as the passenger section 121 is positioned adjacent to the flight deck 110. In these examples, the barrier door 20 is mounted at the front of the passenger section 121.

The barrier door 20 can be used on a variety of vehicles including an aircraft 100 as illustrated. Vehicles 100 include but are not limited to spacecraft, rotorcraft, satellites, rockets, missiles, terrestrial vehicles, surface water borne vehicles, sub-surface water borne vehicles, and combinations thereof.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A barrier door to control movement of people through an opening in a cabin area of an aircraft, the barrier door comprising:
   a body comprising:
      a frame sized to fit within the opening and comprising exterior members that are connected together and form an outer perimeter that extends around a central section;
      a fabric curtain connected to the frame and that extends across the central section;
   a lock connected to the body and configured to engage with an edge of the opening;
   a connector mounted to the frame;
   a post configured to be connected to the aircraft at the edge of the opening, the post being rotatable relative to the frame;
   the post is configured to engage with the connector in the closed position and to rotate relative to the frame; and
   the body movable between an open position that is away from the opening and a closed position that extends across the opening and with the lock engaged to secure the body in the opening.

2. The barrier door of claim 1, further comprising a window positioned within the fabric curtain to enable viewing through the barrier door, and wherein the fabric curtain is opaque and the window comprises one or more openings through the fabric curtain positioned within the central section of the frame.

3. The barrier door of claim 1, wherein the exterior members comprise an upper member and a lower member that each comprise links that are pivotally connected together to allow the frame to fold together in the closed position.

4. The barrier door of claim 3, further comprising interior members that extend between the upper member and the lower member and across the central section, the interior members comprising a unitary, elongated shape.

5. The barrier door of claim 1, wherein the lock comprises a handle positioned on a first side of the body and is configured to face towards a flight deck of the aircraft, the handle positioned away from a second side of the body that faces into a rear cabin area of the aircraft.

6. The barrier door of claim 1, further comprising a fiber optic member attached to the curtain and extending within the central section, the fiber optic member configured to be illuminated in the closed position.

7. The barrier door of claim 1, wherein the lock comprises a magnet configured to engage with the edge of the opening in the closed position.

8. The barrier door of claim 1,
wherein the post is configured to engage with the connector in the closed position and to rotate relative to the frame to apply a tensioning force to the curtain.

9. The barrier door of claim 1, wherein the connector comprises one or more extensions that extend outward from a lateral side of the body and the post comprises one or more receptacles with the one or more receptacles sized to receive the one or more extensions.

10. A barrier door to control movement of people through an opening in a cabin area of an aircraft, the barrier door comprising:
a body sized to fit within the opening, the body movable between an open position and a closed position that extends across the opening;
a lock comprising:
a post configured to be mounted at an edge of the opening;
engagement members mounted to the body and to the post that are configured to engage together; and
wherein the post is configured to rotate relative to the body to apply a tensioning force to the body when the body is in the closed position and the engagement members are engaged together.

11. The barrier door of claim 10, further comprising a handle that is mounted to the post, the handle extending outward in a first direction that is positioned on a first side of the body that faces towards a flight deck of the aircraft when the body is in the closed position and with the handle being shielded from a rear of the cabin area when the body is in the closed position.

12. The barrier door of claim 10, wherein the engagement members comprise receptacles and connectors that are shaped and sized for the connectors to be inserted into and engage with the receptacles.

13. The barrier door of claim 10, wherein the body comprises a plurality of vertical sections that are pivotally connected together and configured to fold together when the body is in the closed position.

14. The barrier door of claim 10, wherein the body comprises:
a frame with exterior members that are connected together and form an outer perimeter that extends around a central section; and
a fabric curtain connected to the frame and that extends across the central section.

15. The barrier door of claim 10, further comprising a window in the body to enable viewing through the body when the body is in closed position.

16. The barrier door of claim 10, further comprising a fiber optic member attached to the body, the fiber optic member configured to be illuminated when the body is in the closed position.

17. A method of controlling movement of passengers along an aisle within a cabin area of an aircraft with the barrier door of claim 1, the method comprising:
prior to opening a flight deck door, moving the barrier door to the closed position with a flight deck being on a first side of the barrier door and a passenger section of the cabin area being on a second side of the barrier door;
locking the barrier door in the closed position;
after locking the barrier door, opening the flight deck door and providing access to flight personnel to a front section of the cabin area;
after providing access to the front section of the cabin area to the flight personnel, reclosing the flight deck door; and
after reclosing the flight deck door, moving the barrier door to the open position and providing access to passengers in the passenger section to the front section of the cabin area.

18. The method of claim 17, wherein locking the barrier door in the closed position comprises:
inserting the connector on the frame into the post; and
rotating the post and applying a tensioning force to the barrier door.

19. The method of claim 17, further comprising:
monitoring the barrier door; and
activating an indicator in the flight deck when the barrier door is in the closed position.

20. The method of claim 17, further comprising moving the barrier door from the closed position to the open position by folding together vertical sections of the barrier door.

* * * * *